C. H. BROWN.
ORE SEPARATOR.
APPLICATION FILED SEPT. 27, 1911.

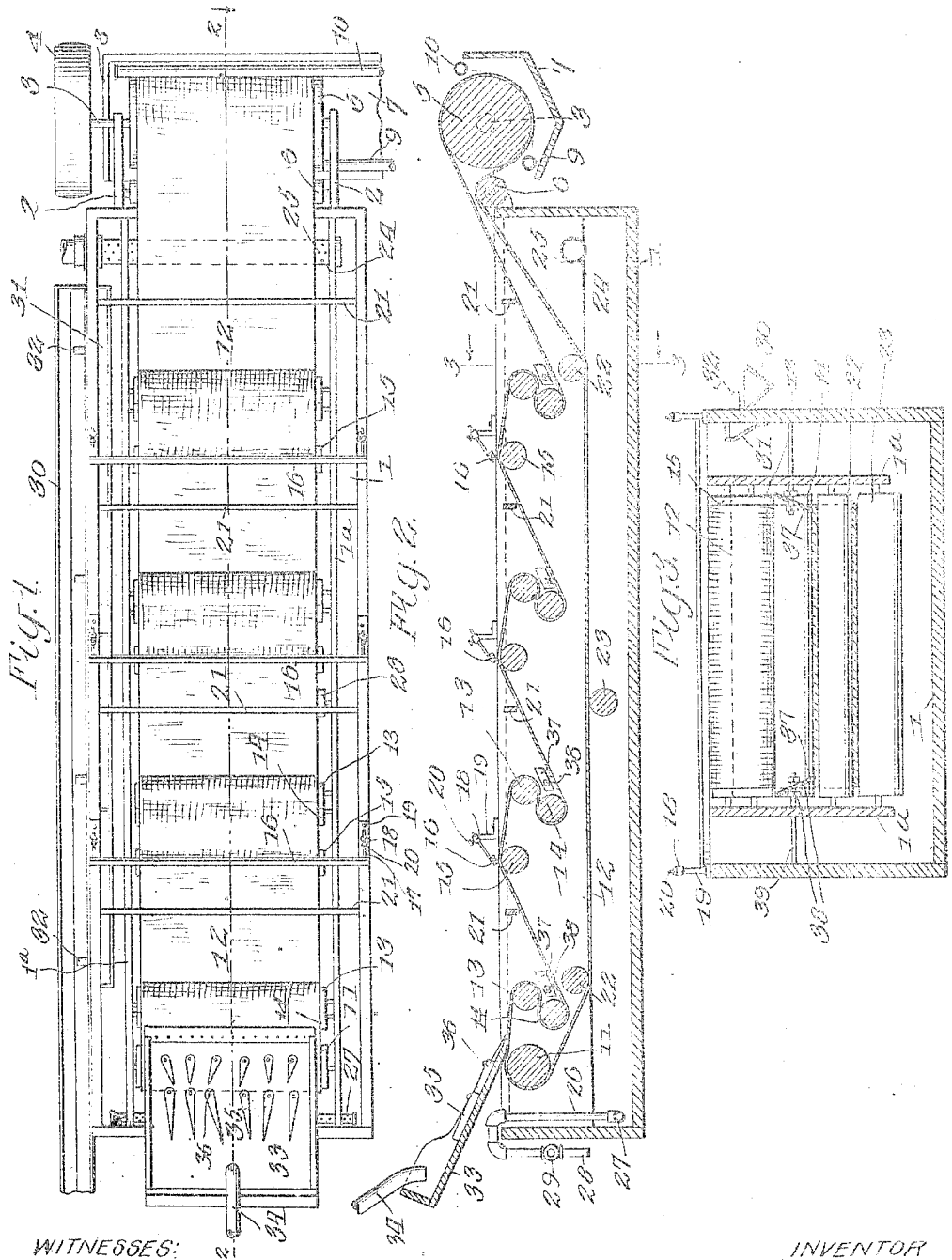

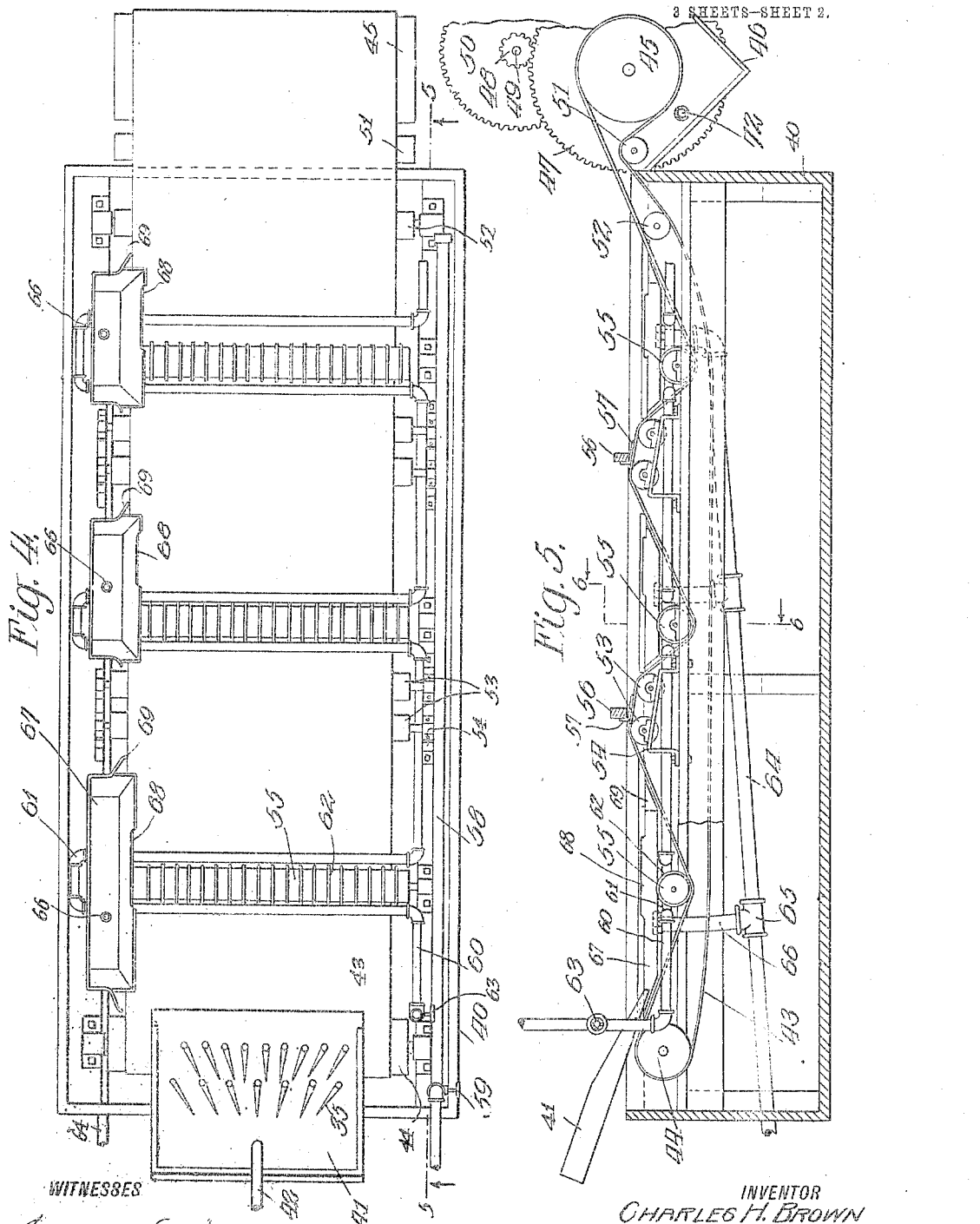

1,081,860.

Patented Dec. 16, 1913.
3 SHEETS—SHEET 3.

WITNESSES

INVENTOR
CHARLES H. BROWN,
BY
ATTORNEYS

# UNITED STATES PATENT OFFICE.

CHARLES HENRY BROWN, OF MAGDALENA, NEW MEXICO, ASSIGNOR TO THE SHERWIN-WILLIAMS COMPANY, OF CLEVELAND, OHIO, A CORPORATION OF OHIO.

ORE-SEPARATOR.

1,081,366.

Specification of Letters Patent.

Patented Dec. 16, 1913.

Application filed September 27, 1911. Serial No. 651,502.

*To all whom it may concern:*

Be it known that I, CHARLES HENRY BROWN, a citizen of the United States, residing at Magdalena, in the county of Socorro and State of New Mexico, have invented a new and useful Improvement in Ore-Separators, of which the following is a specification.

My invention is an improvement in ore separators, and consists in certain novel constructions, and combinations of parts, hereinafter described and claimed.

The general object of the invention is the provision of an apparatus for use in concentrating ore, and the apparatus is particularly adapted to use the method of separation of mineral value from gangue, which is dependent upon the phenomenon of surface tension.

The apparatus for embodying the invention will perform the separation substantially automatically, and thoroughly, with a minimum of attention.

Figure 6:
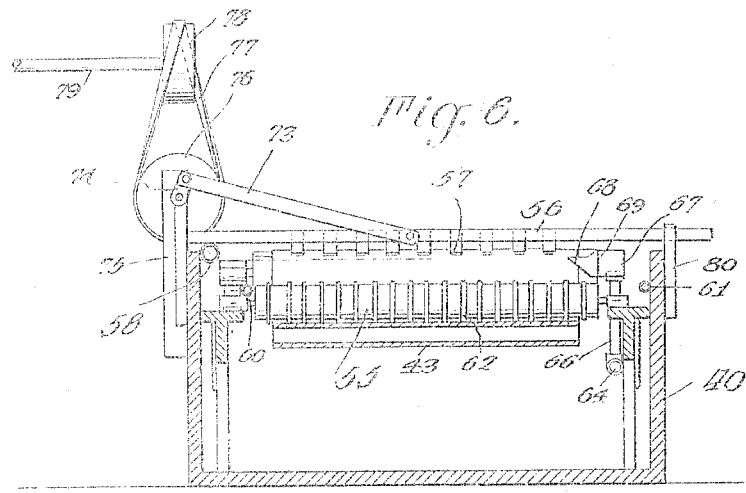
Figure 7:
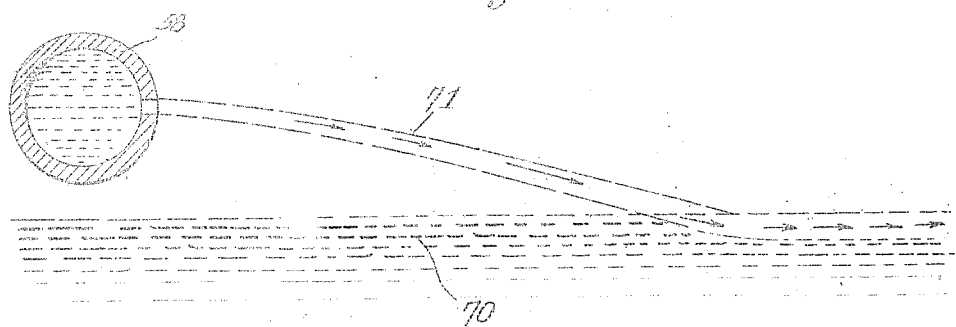

In the drawings, Figure 1 is a plan view of an apparatus embodying the invention; Fig. 2 is a section on the line 2—2 in Fig. 1; Fig. 3 is a section on the line 3—3 in Fig. 2, certain parts being shown in elevation; Fig. 4 is a plan view of an apparatus embodying a modified form of the invention, certain parts being omitted to avoid complexity; Fig. 5 is a section on the line 5—5 in Fig. 4; Fig. 6 is a section on the line 6—6 in Fig. 5, certain parts being shown in elevation, and Fig. 7 is an enlarged sectional detail.

Having regard first to the form shown in Figs. 1, 2 and 3, the apparatus comprises a tank or receptacle 1 of suitable shape, preferably rectangular, and open at its top. Extending longitudinally through the tank are two vertically disposed plates 1ª which are respectively spaced from the sides of the tank and which do not reach to the bottom of the tank. Two brackets 2 extend outwardly from the rear end of the tank, and journaled in them is a shaft 3 provided with a pulley 4 and with a roller 5, a roller 6 being also journaled in the brackets between the tank and the roller 5. A trough 7 underlies the roller 5 and is closed at one end by a wall 8. Two pipes 9 and 10 extend transversely near the roller 5 and are adapted to direct tangential streams of water toward the roller.

At the front end of the tank a roller 11 is journaled in the plates 1ª. Between the roller 11 and the rear end of the tank a plurality of pairs of rollers are journaled in the plates 1ª, each pair comprising a roller 13 and a roller 14 disposed parallel with, but just below and slightly forward of the roller 13. Between each pair of rollers 13 and 14, a roller 15 is journaled between the plates 1ª and slightly above the rollers 13.

An endless conveyer passes rearwardly from the roller 11 over the first roller 13, under the roller 13 and downwardly and forwardly over the roller 14 of the first pair, then rearwardly and upwardly over the succeeding roller 15, then similarly to the succeeding pairs of rollers 13 and 14, and the succeeding rollers 15. From the last pair the conveyer passes upwardly over the roller 5, then forwardly over the roller 6 and down into the tank through which it passes forwardly to the roller 11 guided by suitable rollers 22 and 23 journaled in the plates 1ª.

A bar 16 of fiber or other suitable material extends transversely of the conveyer just above each of the rollers 15 and slightly spaced above the conveyer. The bar 16 is provided at its opposite ends with arms 17 adjustable through bearings 18 carried by brackets 19 which are secured to the side walls of the tank, and the arms may be secured in adjusted position by set screws 20. Between each pair of rollers 13 and 14 and the succeeding roller 15, is a transverse bar 21 which reaches almost down to the conveyer, but a space exists between the bottom of the bar and the conveyer.

At the rear end of the apparatus, a pipe 24 extends transversely through the tank and it is perforated as at 25. At some suitable point, preferably at the forward end of the apparatus, is a pipe 26 provided with a discharge branch 27 and water inlet connection 28 controlled by a valve 29.

At the forward end of the apparatus an inclined feed board 33 is disposed and is adapted to receive the material to be treated through a pipe 34 which leads from a series of mixing chambers. The board is provided with a plurality of pointed fingers 35 directed upwardly and pivoted at their lower ends 36, the purpose of the fingers being to spread the material as it flows down the board.

Just under each roller 13, two baffle plates 37 are secured adjacent the respective edges of the conveyer by nuts 38 on rods 39, the baffle plates inclining outwardly and rearwardly. Extending along the inner side of one of the walls of the tank is a launder 31 from which a plurality of pipes 32 lead into a launder 30 extending along the outside of the wall.

In operation, the ore is preferably reduced to a pulp in a series of mixing chambers, with which the present invention has nothing to do and which are not shown in the drawings. The pulp fed to the apparatus may or may not include a substance to enhance the flotation of the mineral particles by the phenomenon of surface tension, the use of such a substance being dependent upon the nature of the ore under treatment. The pulp as it flows down the board 33 is spread out and is conveyed to the conveyer 12 on a transverse line which is above the level of the water with which the tank has been previously filled from the water inlet 28. The material deposited upon the conveyer is then carried rearwardly, and because the roller 13 is below the roller 11, the conveyer passes angularly downward through the surface of the water. As the material strikes the surface of the water, the phenomenon of surface tension will cause the mineral particles in the ore to float upon the surface of the water, because having been first exposed to air and then brought to the surface of water they are acted upon by the phenomenon of surface tension and are caused to float. The gangue, however, is not subject to this phenomenon and does not float when it meets the surface of the water but remains on the conveyer and is carried rearwardly and dumped as the conveyer passes downwardly over the roller 13. The gangue thus dumped will carry with it, in practice, some mineral particles which were not floated when the material first met the surface of the water, and it is desirable to effect a further separation of the material. As the material is dumped over the roller 13 it falls to the portion of the conveyer which is passing rearwardly from below the roller 14, and the baffle plates 37 serve to prevent the material from falling over the edges of the conveyer. The conveyer then carries the material rearwardly and upwardly, and as it passes below the bar 21 it is spread out upon the conveyer. The roller 15 is sufficiently high to lift the conveyer from the water, after which it passes downwardly again over the next roller 13, which is low enough to cause the conveyer to pass angularly downward through the surface of the water. As the material is carried through the air over the roller 15, it is again exposed to the air and is further spread by the bar 16. The bar 21 also prevents the mineral particles separated at the first contact of the material with the surface from passing to the conveyer as it rises over the roller 15. As the material passes from the roller 15 downwardly, it again meets the surface of the water and a further separation of mineral particles takes place by a flotation due to the surface tension. The apparatus may be constructed with several rollers 13, 14 and 15 to repeat this operation as many times as the nature of the ore demands. The gangue finally passes upwardly on the conveyer and is dumped over the roller 5 into the trough 7, and as the conveyer passes downwardly into the tank again it is cleaned by the streams directed upon it from the pipes 9 and 10. The water in the tank may be changed periodically or by continued flow. If it is desired to raise the temperature of the water in the tank, it may be done by directing steam into the tank through the pipe 24. The mineral particles which have been caused to float upon the surface of the water, overflow into the launder 31 and thus through the pipes 32 into the launder 30 from which they are led to a suitable discharge.

Referring to Figs. 4, 5, 6 and 7, the modified apparatus comprises a tank 40 with a feed board 41 and material supply pipe 42 substantially like those shown in the figures described. Adjacent the front end of the apparatus a roller 44 is journaled, and rearwardly of it and below the water line is journaled a roller 55. Rearwardly of the roller 55 two rollers 53 are journaled in brackets 54, and at such a height as to carry a conveyer passing over them above the surface of water in the tank. At the rear end and outside of the tank is a roller 45 adapted to be positively driven by a gear train 47, 48, 49 and 50. A trough 46 is disposed below the roller 45. A conveyer 43 passes rearwardly over the roller 44, downwardly under the first roller 55, upwardly over the succeeding roller 53, and similarly under or over, as the case may be, the succeeding rollers until it finally passes upwardly over the roller 45 and then downwardly again through the tank to the roller 44 past guide rollers 51 and 52. A transverse bar 56 carrying flexible strips 57 is disposed just above the conveyer between the rollers 53 of each pair. The bars are carried in brackets 75 and 80 secured to the respective sides of the tank and are respectively reciprocable by a power shaft 79 from which power is transmitted to the bar 56 by pulley 78, belt 77, pulley 76, crank 74, and link 73. A perforated pipe 58, controlled by a valve 59 extends longitudinally of the tank at one side thereof, while on the other side are a series of launders preferably one adjacent each roller 55. These launders 67 are preferably arranged with their upper edges substantially at the level of the water with which the tank will be filled by suitable means, and each launder is provided with a lip 68 cut down below the level of the water, and near each end with deflectors 69. It will be noted that the lips 68 extends over the surface of the conveyer. Opening downwardly from each launder is a pipe 66 connected by a T 65 with a pipe 64. A pipe 60, controlled by a valve 63, also extends longitudinally of the tank, but it is provided with a plurality of U-shaped portions extending transversely of the tank so as to extend along the opposite sides of the respective rollers 55, which are provided with ribs 62 to prevent close contact between the rollers and the conveyer. A perforated pipe 72 extends transversely of the tank adjacent the roller 45.

The general principle of operation of the modified apparatus is substantially the same as that of the form first described. The pulp formed by mixing the ore with water and, if desired, with some substance to enhance the flotation power of the mineral particles, is flowed down the board 41 on the rearwardly moving conveyer 43. As the material, in flowing down the board, first strikes the surface of the water, a large separation of mineral particles from the gangue takes place, due to the fact that the particles have been exposed on the board to the air so that when they meet the surface of the water the phenomenon of surface tension is effective to cause them to float. The remaining gangue, with some mineral particles mechanically carried thereby, is conveyed rearwardly into the water by the conveyer and under the first roller 55, the ribs on the roller holding the conveyer out of close contact to allow the passage of the pulp. The continued movement of the conveyer exposes the pulp again to air, the pulp being thinly distributed by the bar 56 and its flexible strips, and as it passes from rollers 53 which have lifted the conveyer from the water, the conveyer passes downwardly angularly through the surface of the water and a further separation of the mineral particles takes place. The separation may be continued by providing the apparatus with the desired number of similar rollers. The gangue is finally dumped into the trough 46, the conveyer being, at the same time, washed by a tangential stream from the pipe 72.

It is found, in practice, that an increase in temperature will often enhance the flotation power of the aired mineral particles, and for this purpose the invention provides the steam pipe 60 with the perforated U-shaped portions 61 through which steam may be discharged to increase the temperature of the water and pulp. The pipe 58 discharges streams of water transversely across the body of water in the tank near its surface for the purpose of causing the mineral particles floating upon the surface to flow into the launders 67, whence they are discharged.

It will be obvious that many changes may be made in the apparatus without departing from my invention.

I claim—

1. In apparatus of the class described, the combination of a liquid tank; a plurality of transversely extending guides secured in the tank in a longitudinal series and disposed alternately above and below the designed level of the liquid; a longitudinally movable conveyer guided by the guides and passing alternately upwardly and downwardly angularly through the surface of the liquid; and a device at one end of the series of guides for feeding material to the conveyer in the direction of its movement.

2. In apparatus of the class described, the combination of a liquid tank; a plurality of transversely extending rolls secured in the tank in a longitudinal series and disposed alternately above and below the designed level of the liquid; a longitudinally movable conveyer guided by the rolls and passing alternately upwardly and downwardly angularly through the surface of the liquid; and a device at one end of the series of rolls for feeding material to the conveyer in the direction of its movement.

3. In apparatus of the class described, the combination of a liquid tank; a plurality of spaced rolls in the tank disposed alternately above and below the designed level of the liquid; a roll disposed outside of the tank beyond one of the end rolls within the tank; a movable conveyer guided by the rolls; a device adjacent the roll at the end opposite the outside roll for feeding material to the conveyer in the direction of its movement; and a plurality of spreaders respectively disposed transversely of and above the conveyer adjacent the several rolls disposed above the liquid level.

4. In apparatus of the class described, the combination of a liquid tank; a plurality of spaced rolls in the tank disposed alternately above and below the designed level of the liquid; a roll disposed outside of the tank beyond one of the end rolls within the tank; a movable conveyer guided by the rolls; a device adjacent the roll at the end opposite the outside roll for feeding material to the conveyer in the direction of its movement; a plurality of spreaders respectively disposed transversely of and above the conveyer adjacent the several rolls disposed above the liquid level; and means for varying the temperature in the tank.

5. In apparatus of the class described, the combination of a liquid tank; a plurality of spaced rolls in the tank disposed alternately above and below the designed level of the liquid; a roll disposed outside of the tank beyond one of the end rolls within the tank; a movable conveyer guided by the rolls; a device adjacent the roll at the end opposite the outside roll for feeding material to the conveyer in the direction of its movement; a plurality of spreaders respectively disposed transversely of and above the conveyer adjacent the several rolls disposed above the liquid level; a steam pipe extending within the tank; and a launder at the side of the conveyer adjacent the liquid level.

6. In apparatus of the class described, the combination of a liquid tank; a plurality of spaced rolls in the tank disposed alternately above and below the designed level of the liquid, the rolls below such level having a plurality of spaced peripheral ribs; a movable conveyer extending over the rolls above such level and under the rolls below such level; and a device adjacent an end roll for feeding material to the conveyer in the direction of its movement.

7. In apparatus of the class described, the combination of a liquid tank; a plurality of spaced rolls in the tank disposed alternately above and below the designed level of the liquid, the rolls below such level having a plurality of spaced peripheral ribs; a movable conveyer extending over the rolls above such level and under the rolls below such level; a device adjacent an end roll for feeding material to the conveyer in the direction of its movement; a plurality of spreaders respectively disposed transversely of and above the conveyer adjacent the several rolls disposed above the liquid level; and means for transversely reciprocating the spreaders.

CHARLES HENRY BROWN.

Witnesses:
W. SYDNEY STEVENS,
CECIL B. MATHEWS.